UNITED STATES PATENT OFFICE 2,464,177

VINYL CHLORIDE RESINS STABILIZED WITH ALKALI METAL OR ALKALINE EARTH METAL SALTS OF NITRO SUBSTITUTED ALKANES

John K. Fincke, Dayton, Ohio, assignor to Monsanto Chemical Company, St. Louis, Mo., a corporation of Delaware No Drawing. Application April 15, 1948, Serial No. 21,316

6 Claims. (Cl. 260—88)

This invention relates to a method of stabilizing vinyl chloride resins against the discoloration usually caused by elevated temperatures. More particularly it relates to a method of compounding polyvinyl chloride and vinyl chloride copolymers to enable them to withstand the action of heat.

When polyvinyl chloride or copolymers of substantial proportions of vinyl chloride and minor proportions of other mono olefinic compounds are subjected to temperatures above 160° C., they rapidly become discolored and ultimately light transmission properties are destroyed. For the purpose of remedying this defect a wide variety of stabilizing agents have been suggested. Many of the stabilizing agents are effective only for short periods of time and many others are effective only in specific formulations. There is a substantial need in the vinyl resin field for stabilizing agents which are effective more universally and which are effective over wider temperature ranges and under many different conditions of operation.

The purpose of this invention is to provide a new and very useful stabilizing agent which is relatively inexpensive and effective under widely different conditions of operation. A further purpose of this invention is to provide a new vinyl chloride composition which is resistant to decomposition at the high temperatures frequently encountered in insulation and dielectric applications, and which is capable of being extruded, mixed or rolled at temperatures at which the resin becomes plastic without danger of discoloration.

It has been found that the alkali metal and alkaline earth metal salts of nitro substituted alkanes are particularly effective as stabilizers. Of particular utility are compounds, such as sodium salt of 1-nitropropane, the sodium salt of nitromethane, the sodium salt of 1-nitro-n-butane, the sodium salt of nitroethane, the sodium salt of 3-nitro-n-butane, the sodium salt of other nitro alkanes having from one to five carbon atoms, and the corresponding potassium, calcium, barium, strontium, and magnesium salts. The stabilizing agents are effective in a wide variety of proportions, for example from 0.1 percent by weight to five percent by weight.

The vinyl chloride resins useful in the practice of this invention are polyvinyl chloride, and copolymers of at least 70 percent of vinyl chloride and up to 30 percent of other polymerizable mono olefinic monomers compatible with vinyl chloride, for example vinyl acetate and other vinyl esters of mono-carboxylic acids, ethyl maleate, ethyl fumarate and other alkyl esters of maleic and fumaric acids, methyl acrylate, methyl methacrylate and other alkyl esters of acrylic and methacrylic acids, and vinylidene chloride. These polymers and copolymers may be prepared by any of the well known methods, but the polymerization in aqueous emulsion is generally the most effective method of preparation.

The method of stabilizing the vinyl chloride resins involves merely the incorporation of the salts of the nitro alkanes by any mixing expedient. Generally roll mills and Banbury type mixers have been found to be very useful. The resins may be compounded with or without plasticizers, depending upon the ultimate use of the resins. If no plasticizer is to be used the stabilizers may be dispersed effectively by utilizing polymers in aqueous emulsions, otherwise it will be found desirable to use plasticizers, because the compounding by milling and fabrication operations are facilitated at temperatures well below the decomposition temperature of the resin. Suitable plasticizing agents for the vinyl resins are dioctyl phthalate, tricresyl phosphate, dibutyl sebacate, polyesters, N-dialkylamides of fatty acids, complex phosphates, or diesters of adipic and other dibasic aliphatic acids.

Further details of the practice of this invention are set forth with respect to the following specific example.

*Example*

Two 100 gram samples of polyvinyl chloride were blended on a laboratory roll mill with 50 grams of dioctyl phthalate. To one of the samples there was added one gram of the sodium salt of 1-nitropropane. The stabilized sample and the control were each blended on the roll mill at 300° F. for five minutes and then formed into a sheet 0.020 inch in thickness. Samples cut from this sheet were subjected to light transmission tests in accordance with A. S. T. M. specification D-672-44T. The following table shows the percent of light transmitted prior to the subjecting of the samples to heat and after one-half hour and one hour periods of heating at 160° C.

|  | Light Transmission | | |
| --- | --- | --- | --- |
|  | 0 hours | ½ hour | One hour |
| Stabilized Resin | *Percent* 88 | *Percent* 85 | *Percent* 85 |
| Control | 86 | 75 | 63 |

Although the invention has been described with respect to a specific example, it is not intended that the details thereof shall be construed as limitations upon the scope of the invention except to the extent incorporated in the following claims.

I claim:

1. A vinyl chloride resin stabilized against discoloration at elevated temperatures, which comprises a polymer in which at least 70 percent of the monomeric components is vinyl chloride, said polymer containing intimately dispersed therein from 0.1 to five percent of the salts of the group consisting of alkali metal and alkaline earth metal salts of nitro substituted alkanes having from two to four carbon atoms.

2. A stabilized polyvinyl chloride which comprises polyvinyl chloride having intimately dispersed therein from 0.1 to five percent of the salts of the group consisting of alkali metal and alkaline earth metal salts of nitro substituted alkanes having from two to four carbon atoms.

3. A stabilized vinyl chloride resin which comprises a copolymer of at least 70 per cent vinyl chloride and up to 30 percent of a monomeric substance of the group consisting of vinyl esters of carboxylic acids, alkyl acrylates, alkyl methacrylates, alkyl fumarates, alkyl maleates and vinylidene chloride, said resin containing intimately dispersed therein from 0.1 to five percent of the salts of the group consisting of alkali metal and alkaline earth metal salts of nitro substituted alkanes having from two to four carbon atoms.

4. A vinyl chloride resin stabilized against discoloration at elevated temperatures, which comprises a polymer in which at least 70 percent of the monomeric components is vinyl chloride, said polymer containing intimately dispersed therein a plasticizer and from 0.1 to five percent of the salts of the group consisting of alkali metal and alkaline earth metal salts of nitro substituted alkanes having from two to four carbon atoms.

5. A stabilized polyvinyl chloride which comprises polyvinyl chloride having intimately dispersed therein a plasticizer and from 0.1 to five percent of the salts of the group consisting of alkali metal and alkaline earth metal salts of nitro substituted alkanes having from two to four carbon atoms.

6. A stabilized vinyl chloride resin which comprises a copolymer of at least 70 percent vinyl chloride and up to 30 percent of a monomeric substance of the group consisting of vinyl esters of carboxylic acids, alkyl acrylates, alkyl methacrylates, alkyl fumarates, alkyl maleates and vinylidene chloride, said resin containing intimately dispersed therein a plasticizer and from 0.1 to five percent of the salts of the group consisting of alkali metal and alkaline earth metal salts of nitro substituted alkanes having from two to four carbon atoms.

JOHN K. FINCKE.

No references cited.